July 10, 1962     S. P. NOVAK     3,043,077
GUARD FOR POWER MOWERS
Filed Oct. 3, 1960

INVENTOR.
STANLEY P. NOVAK
BY Robert R. Yontie
ATTORNEY

Patented July 10, 1962

3,043,077
GUARD FOR POWER MOWERS
Stanley P. Novak, 2 Highland Ave., Belmont Hills, Pa.
Filed Oct. 3, 1960, Ser. No. 60,057
3 Claims. (Cl. 56—255)

This invention relates generally to safety devices for power mowers, and is especially concerned with a unique guard construction for the discharge outlet of rotary power mowers.

As is well-known, rotary power mowers are conventionally provided with a discharge outlet or opening for passing the grass cuttings to be collected or dispersed. Such discharge outlet often assumes the form of a horizontally facing opening in one side wall of the mower housing, and the housing is sometimes configured to define a guide channel or chute extending to the discharge opening.

However, in addition to the discharge of grass cuttings, it is not uncommon for wires, nails, glass, and other sharp and dangerous objects to be forcibly impelled out through the discharge opening. This constitutes a serious hazard to persons in the general area of a rotary mower, and has, in fact, resulted in numerous cases of bodily injury.

It is, therefore, an object of the present invention to provide a protective guard for use over the discharge opening of a rotary mower which permits the discharge and dispersal therethrough of safe particles, such as grass cuttings, but which retards and deflects the motion of dangerous articles, such as nails, wire, glass and the like.

It is a further object of the present invention to provide a guard construction of the type described which is extremely simple, requiring a minimum number of parts, durable throughout a long, useful life, and which is entirely reliable under all conditions of operation.

The instant invention further contemplates the provision of a protective guard having the advantageous results mentioned in the preceding paragraphs, and which enables a power mower to be operated in the conventional manner without any special provision for use of the guard, and wherein a guard of the present invention may be applied to a conventional mower as an accessory or attachment, or may be incorporated in the mower construction during manufacture thereof.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figure 1:
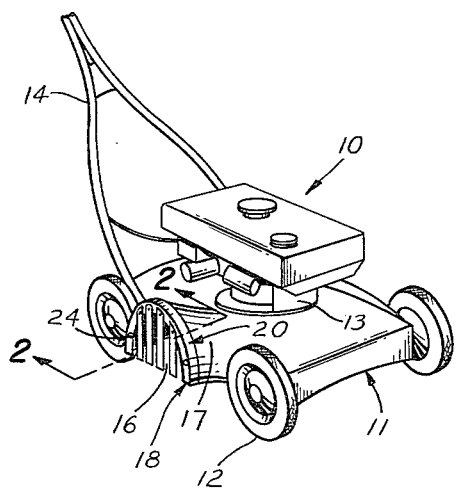
FIGURE 1 is a top perspective view showing a rotary power mower having a protective guard constructed in accordance with the teachings of the present invention.
Figure 2:
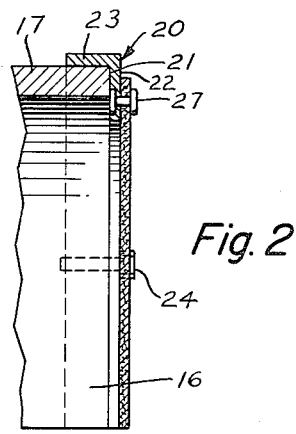
FIGURE 2 is an enlarged partial sectional view taken substantially along the line 2—2 of FIGURE 1.
Figure 3:
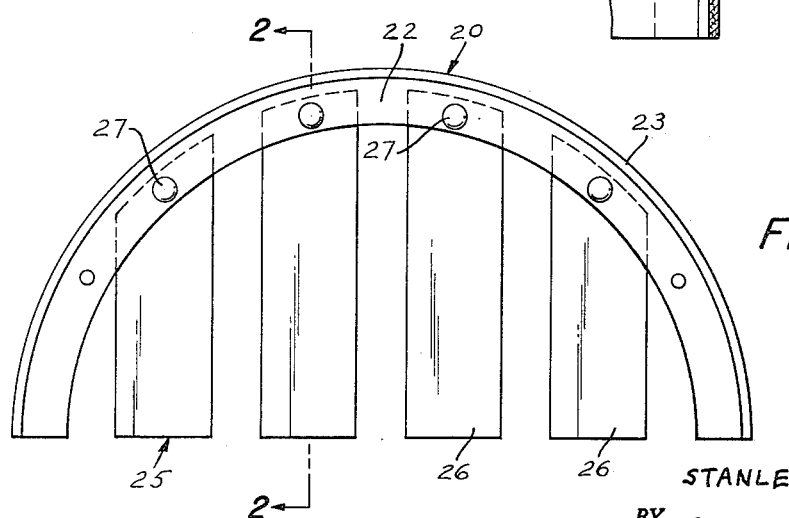
FIGURE 3 is an enlarged interior elevational view showing the guard construction of the present invention apart from a mower.

Referring now more particularly to the drawings, and specifically to FIGURES 1 and 2 thereof, a mower is there generally designated 10, and includes a housing 11 having ground-engageable wheels 12, and provided with a power source or motor 13 and handle 14. As thus far described, the mower 10 may be conventional.

On one side of the mower housing 11, there is provided a discharge outlet or opening 16, which may be defined as the open end or extremity of a downwardly facing channel or chute 17 formed integrally of the mower housing. That is, the chute or passageway 17 extends generally tangential to the path of cutter rotation and terminates at the discharge outlet 16, which opens generally horizontally through one side of the mower housing.

Engaged over the discharge opening 16, on the open end of the channel 17 is a guard, generally designated 18, constructed in accordance with the teachings of the instant invention.

The guard includes an elongate, relatively stiff element or frame 20, which is illustrated as being of a generally semicircular configuration to extend conformably along the end region 21 of chute 17 bounding the opening 16.

The frame 20 may be formed of angle stock, including a generally flat, arcuate flange 22 disposed normal to the path of particle flow through the discharge opening 16, and extending in conforming facing engagement with the outlet end region 21 of the chute 17. The frame 20 may also include a flange 23 disposed generally normal to the flange 21, being curved and extending along the radially outer edge of the latter flange in conforming embracing engagement about the chute 17. Thus, the flange 23, being normal to the flange 22, is disposed substantially parallel to the path of particle flow through the outlet 16. Fasteners, such as at 24, may extend through the flange 22 of the frame 20 inward through the chute 17 for securement therein; and, by the conforming and embracing engagement of the flanges 22 and 23 with the end region of the chute 17, the frame is securely fastened in position bounding the opening 16.

Carried by frame 20, extending across the opening 16 within the area bounded by the frame, is flexible screen means, generally designated 25. The screen means 25 is normally disposed in a vertical plane across the opening 16, having its upper end regions anchored fast to the frame 20, and its lower end region free for deflection under the impact of particles being discharged. More specifically, the screen means 25 is preferably fabricated of a plurality of generally coplanar, vertically disposed strips 26, each having its upper end anchored, as by a rivet 27 to the flange 22, its lower end depending therefrom and remaining free. The strips 26 are preferably located in side-by-side, spaced relation, to permit the passage therebetween of relatively small particles, such as grass cuttings or clippings, while effectively deterring the forcible passage therethrough of dangerous articles, such as wire, nails or glass. As the screen means or flexible strips 26 are anchored at the top, and have the lower region free, it is apparent that dangerous articles will be retarded and deflected downward for complete safety to persons and objects in the area of operation.

From the foregoing, it is seen that the present invention provides a protective guard which fully accomplishes its intended objects and is well-adapted to meet practical conditions of manufacture, installation and use.

Although the present invention has been described in some detail by way of illustration and example for purposes of clarity of understanding, it is understood that certain changes and modifications may be made within the spirit of the invention and scope of the appended claims.

What is claimed is:

1. A protective guard for the discharge outlet of a rotary power mower, said guard comprising a frame adapted to extend along and be secured to the bounding region of a mower discharge opening, and flexible screen means secured to and extending across the area within said frame, said screen means comprising a plurality of flexible strips extending generally vertically in spaced substantially coplanar relation each having its upper end anchored to said frame and having its lower end free, to thereby deflect and retard relatively large and dangerous particles while passing substantial quantities of grass cuttings.

2. A protective guard according to claim 1, said frame being of an elongate configuration conformable to the bounding region of said outlet and being of angulate cross section having one flange extending generally normal to the direction of particle discharge and having another flange extending generally parallel to the direction of particle discharge, said strips being secured to and substantially coplanar with said one flange.

3. The combination with a rotary mower including a housing having a generally horizontally opening discharge outlet of a guard for said outlet, said guard comprising a plurality of flexible strips extending generally vertically in side-by-side substantially coplanar spaced relation each having its upper end anchored relative to said housing and having its lower end free, to thereby deflect and retard relatively large and dangerous particles while passing substantial quantities of relatively small grass cuttings.

References Cited in the file of this patent
UNITED STATES PATENTS

| | | |
|---|---|---|
| 2,489,059 | Surgi | Nov. 22, 1949 |
| 2,495,032 | Stuhl | Jan. 17, 1950 |
| 2,578,880 | Doyle | Dec. 18, 1951 |
| 2,659,191 | Miller et al. | Nov. 17, 1953 |
| 2,751,737 | Herod | June 26, 1956 |
| 2,802,327 | Thelander | Aug. 13, 1957 |
| 2,963,842 | Estes | Dec. 13, 1960 |